US010604355B2

(12) United States Patent  
Johnson et al.

(10) Patent No.: US 10,604,355 B2  
(45) Date of Patent: Mar. 31, 2020

(54) FLIGHT AND PRODUCT INDEXING ASSEMBLIES FOR PACKAGING

(71) Applicant: R.A. Pearson Company, Spokane, WA (US)

(72) Inventors: Michael James Johnson, Spokane, WA (US); Steven Joseph Allard, Spokane, WA (US); David John Nelson, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 0 days.

(21) Appl. No.: 16/024,280

(22) Filed: Jun. 29, 2018

(65) Prior Publication Data

US 2019/0002208 A1 Jan. 3, 2019

Related U.S. Application Data

(60) Provisional application No. 62/527,545, filed on Jun. 30, 2017.

(51) Int. Cl.
| | |
|---|---|
| *B65G 47/28* | (2006.01) |
| *B25J 11/00* | (2006.01) |
| *B65B 5/08* | (2006.01) |
| *B65B 35/44* | (2006.01) |
| *B65B 5/06* | (2006.01) |
| *B65B 35/36* | (2006.01) |
| *B65G 47/08* | (2006.01) |
| *B65B 63/02* | (2006.01) |

(52) U.S. Cl.
CPC ............... *B65G 47/28* (2013.01); *B25J 11/00* (2013.01); *B65B 5/061* (2013.01); *B65B 5/068* (2013.01); *B65B 5/08* (2013.01); *B65B 35/36* (2013.01); *B65B 35/44* (2013.01); *B65G 47/082* (2013.01); *B65B 63/02* (2013.01); *B65G 2201/0238* (2013.01)

(58) Field of Classification Search
CPC .................. B65G 47/28; B65G 47/028; B65G 2201/0238; B65B 63/02  
USPC ........................................................ 198/434  
See application file for complete search history.

(56) References Cited

U.S. PATENT DOCUMENTS

| 7,104,031 B2 * | 9/2006 | Baggot ................. B65B 25/146 53/439 |
| 2007/0289842 A1 * | 12/2007 | Damhuis ................ B65G 47/32 198/434 |

\* cited by examiner

*Primary Examiner* — Gene O Crawford  
*Assistant Examiner* — Lester Ill Rushin  
(74) *Attorney, Agent, or Firm* — Lee & Hayes, P.C.

(57) ABSTRACT

Flight and indexing assemblies for automated packaging systems provide better product spacing for faster and more reliable automation. In an example, a plurality of flights may include a plate- or sheet-like body with a perpendicular flange extending from an upper portion of the flight. Two adjacent flanges contain a pouch or other product to be packaged in a case. A flange constrains an upper portion of each pouch to a confined and predetermined area, thereby aiding grippers of an end-of-arm tool to grasp the pouches. A flight and product indexing assembly is configured to control spacing between adjacent flights, and to position pouches constrained between adjacent flights, so that flights position product at predetermined locations for gripping by the end-of-arm tool.

18 Claims, 17 Drawing Sheets

1514
EXTEND A FLIGHT AND PRODUCT INDEXING ASSEMBLY TO SECURE FLIGHTS IN A PRECISE LOCATION AND TO MOVE PRODUCT AS NEEDED. FIG. 5 SHOWS ASSEMBLY ENGAGING FLIGHTS

1516
MOVE GRIPPERS OF AN END-OF-ARM TOOL TOWARD UPPER PORTIONS OF POUCHES IN PREPARATION TO BE GRASPED. FIG. 6 SHOWS GRIPPERS MOVING TOWARD POUCHES

1518
GRIP UPPER PORTIONS OF POUCHES, SUCH AS WITH GRIPPERS OF AN END-OF-ARM TOOL. FIG. 7 SHOWS GRIPPERS OF END-OF-ARM TOOL A PLURALITY OF GRIPPING POUCHES

1520
WITHDRAW POUCHES FROM FLIGHTS, SUCH AS BY HORIZONTAL MOVEMENT OF THE END-OF-ARM TOOL. FIG. 8 SHOWS ROBOTIC ARM MOVING END-OF-ARM TOOL AND POUCHES TOWARD THE EMPTY CASE

1522
MOVE PRODUCT (E.G., A GROUP OF POUCHES) TO A LOCATION OVER A CASE TO BE FILLED WITH THE PRODUCT. MOVEMENT MAY BE BY END-OF-ARM TOOL. FIG. 9 SHOWS END-OF-ARM TOOL HOLDING POUCHES ABOVE EMPTY CASE, AND PADDLES SQUEEZING POUCHES TOGETHER

↓

1524
LOWER A GROUP OF POUCHES INTO A CASE, USING PRODUCT CONDITIONING PADDLES TO SQUEEZE THE POUCHES, IF NECESSARY, TO FIT INTO THE CASE. FIG. 10 SHOWS POUCHES INSIDE CASE. GRIPPERS SET TO RELEASE.

↓

1526
RELEASE GRIP ON THE POUCHES, AND LEAVE THEM IN THE CASE. PRODUCT CONDITIONING PADDLES RELEASE TENSION ON PRODUCT. FIG. 11 SHOWS THE END-OF-ARM TOOL, HAVING RELEASED THE PRODUCT, AND MOVED ABOVE THE NOW-FILLED CASE.

FIG. 15C

FLIGHT AND PRODUCT INDEXING ASSEMBLIES FOR PACKAGING

RELATED APPLICATIONS

This patent application claims priority to U.S. patent application Ser. No. 62/527,545, titled "Flight and Product Indexing Assemblies for Packaging," filed on Jun. 30, 2017, commonly assigned herewith, and hereby incorporated by reference.

BACKGROUND

Stand-up pouches are used to package many items for retail sale. Examples of products packaged in stand-up pouches include granola and other processed fruits and grains, dried meats, pet treats, and other products. Stand-up pouches may be formed of a front and back of a flexible sheet material. A narrow bottom panel supports the pouch in a standing position, such as on a shelf in a retail store. A hole may be defined in an upper portion of the pouch so that it may be hung on a hook in a store. A re-sealable fastener may be provided, so that the consumer may re-seal the package if all of the product is not consumed in a single setting.

Stand-up pouches are packaged for shipment in cases, such as cardboard boxes. This is generally an automated process, wherein robotic arms with end-of-arm tools grasp several stand-up pouches and put them in a single case. While known systems have merit, better systems are desired.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIGS. 15A, 15B and 15C collectively form a flowchart showing example methods by which a flight indexing assembly (e.g., a flight indexer that advanced to, and secures in place, a plurality of flanges) and a product indexer (e.g., flanges carried by flights that adjust product position) may be used in an automated pouch-packaging system.

DETAILED DESCRIPTION

Overview

Figure 1:
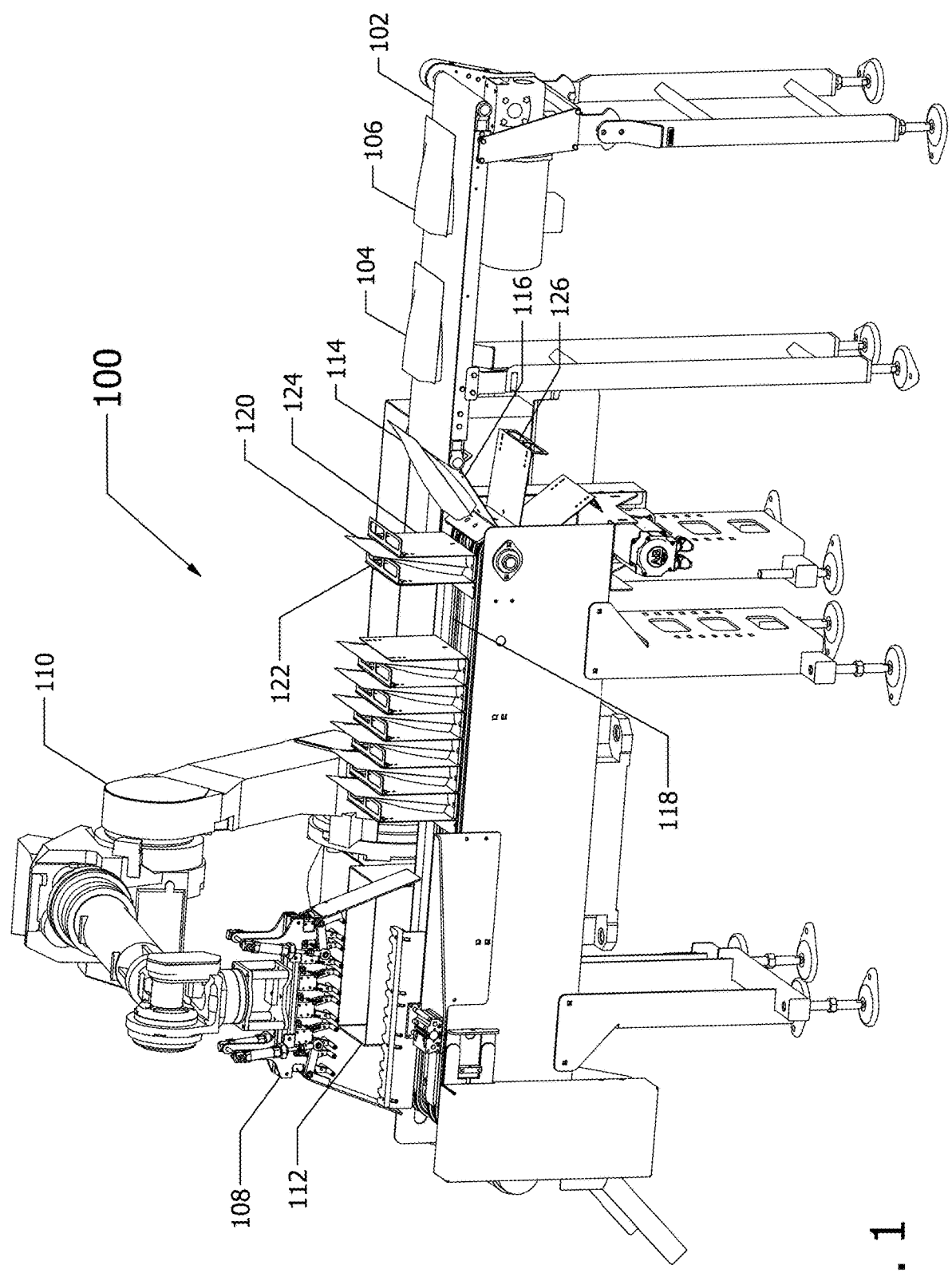
FIG. 1 is a perspective view of an example stand-up pouch-packaging assembly, wherein stand-up pouches arrive on a conveyor, are racked into groups defined by groups of flights, and grasped by an end-of-arm tool for transfer to a case.

The disclosure describes a flight indexing assembly and a product indexing assembly for use with a stand-up pouch-packaging system. Flight indexing relates to control and regulation of spacing between flights, which contain and move product items (e.g., pouches containing candy or granola). Such control and regulation is particularly important when product is removed from the flights, such as by an end-of-arm tool. Product indexing relates to positioning of a product item within the area confined by the flights, which may be plate-like in configuration, and which may have a perpendicular flange to position and constrain a product item into a predetermined location at a predetermined time. In an example, the top portion of a pouch is constrained to be in a location at which grippers of an end-of-arm tool expect the top portion. Thus, flight indexing and product indexing combine to place product at a place and time expected by the grippers and end-of-arm tool.

In an example of packaging system operation, pouches containing product (e.g., packages of candy, granola, etc.) that are configured for retail sale are moving individually on a conveyor belt. Each pouch within a group of pouches is removed from the conveyor and located between two adjacent flights. A robotic arm with an end-of-arm tool may grasp the group of pouches and place the group into a case (e.g., a cardboard box) to be sealed and shipped. The techniques described herein particularly describe how the location of each pouch, confined between two flights, is controlled with sufficient precision to allow the end-of-arm tool to quickly and successfully grasp and move each pouch in a repeatable automated manner.

In an example product indexing system, pouches are taller than the flights between which they are confined. Accordingly, an upper portion of each pouch extends above an upper portion of the flights, thereby aiding grippers of an end-of-arm tool to grasp each pouch. However, because the pouches are made of a flexible material the upper portion may be imprecisely located. To reduce this imprecision, a flange extends perpendicularly from an upper portion of each flange, thereby confining the upper portion of each pouch into a more precisely controlled area. The flights 120, with perpendicular flanges 200, are seen in a number of figures, including FIGS. 12 and 13.

In an example of flight indexing, the flights may be made of sheet metal, and may be imprecisely located. In the example, a plurality of pouches, each confined between two flights, arrives at a location expected by the end-of-arm tool. A flight and product indexer defines a plurality of V-shaped slots in defined locations. The flight and product indexer is advanced, causing each flight to be held in place by a corresponding V-shaped slot. Additionally, the flight and product indexer may define notches, which assist in more precisely locating pouches within an area between two adjacent flights.

Thus, the synergistic interaction between the flanges carried by flights, which assist to locate a top portion of each pouch, and the flight and product indexer, which assists to fix locations of the flights and the pouches carried between flights, results in greater success by the grippers of the end-of-arm tool in gripping an upper portion of each pouch.

Example System and Flight and Product Indexer Assembly

FIG. 1 shows an example stand-up pouch-packaging assembly 100. A conveyor belt 102 delivers pouches 104, 106 to be racked by flights (e.g., six pouches are moved in a precise manner by seven flights). The flights are moved from a position at which they receive the pouches, to a position at which the pouches are removed by an end-of-arm tool 108 carried by a robotic arm 110. After movement of the robotic arm 110, the end-of-arm tool 108 deposits a plurality of pouches in a case (e.g., cardboard box 112).

The conveyor belt 102 transports a stream of stand-up pouches, including pouches 104, 106, which are typically lying on their front or back sides. The stand-up pouches have a bottom surface that allows them to stand up on a store shelf or other display area. The stand-up pouches may also have a hole in an upper area, for mounting on a display hook in a store.

In the example shown, pouches 104, 106 are moving on the conveyor belt 102. A pouch 114 has been propelled off the end of the conveyor 102, and has landed on a flight 116, which is moving in a generally counter-clockwise direction, driven by a chain-drive 118. An earlier-delivered pouch 120, is already in position between two flights 122, 124. An additional flight 126 is moving, driven by the chain-drive 118, into position to receive pouch 104.

As the flights continue to move in the counter-clockwise direction, each pouch becomes located between two flights. In an example, six pouches may be located between seven flights, although these numbers are purely for purposes of illustration, and not limitation. The seven flights may be grouped together and moved by endless chain-drives between a position wherein pouches are received, and a position wherein pouches are removed by the end-of-arm tool. One or more groups of flights may be driven by one or more chain drive assemblies.

Figure 2:
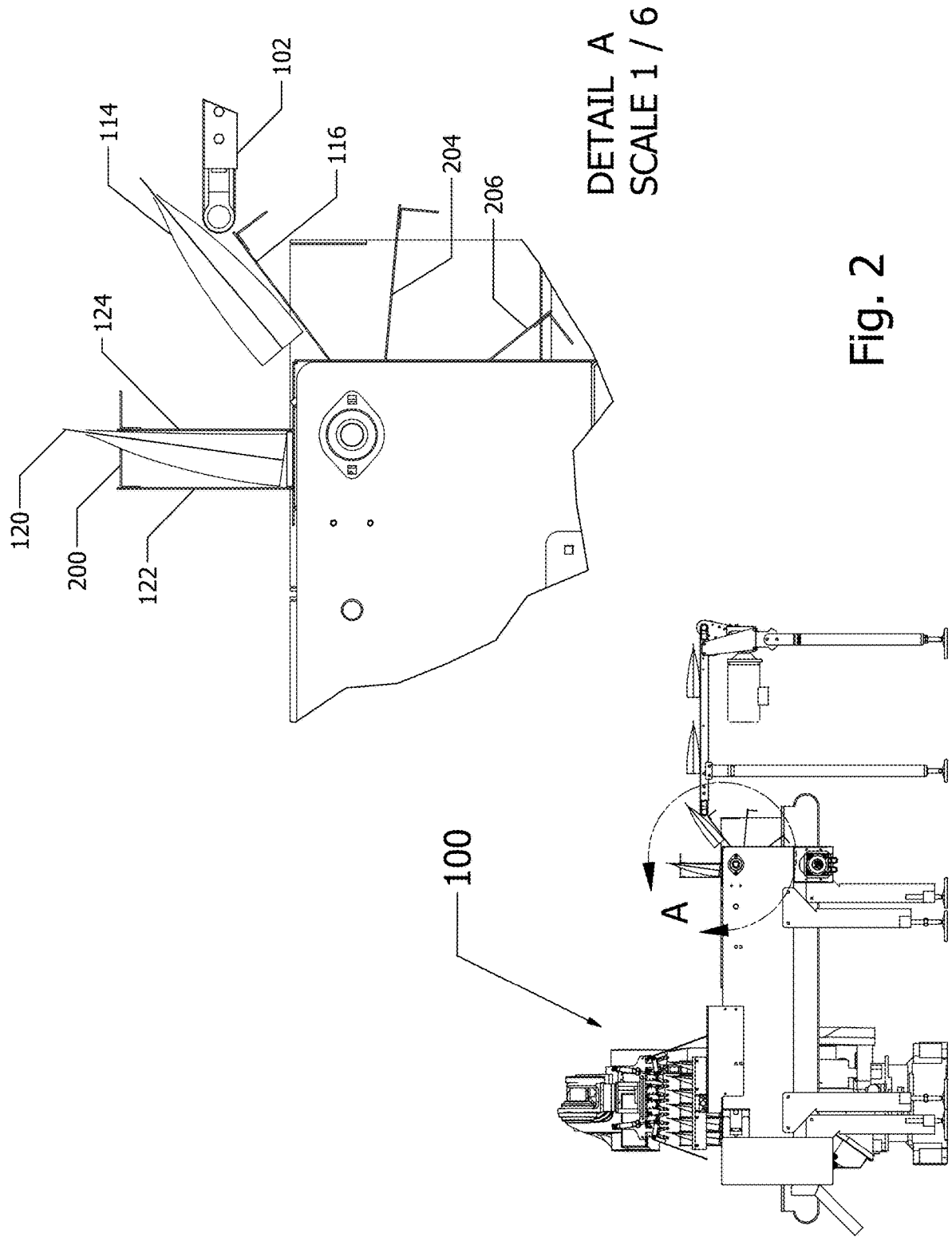
FIG. 2 is an orthographic view of stand-up pouches being inserted between flights.

FIG. 2 shows the stand-up pouch-packaging assembly 100, having a blown-up view of stand-up pouches being inserted between flights. A pouch 120 is held in position between a first flight 122 and a second flight 124. An upper portion of the pouch 120 is held more precisely in position by a flange 200, extending perpendicularly from an upper portion of the flight 122. A third flight 116 is moving into position to catch a pouch 114 that is moving off the end of the conveyor belt 102. In the example shown, the pouch 114 lands on the side of the third flight 116 to which a flange is not attached. As the flight 116 moves around the corner, propelled by a chain drive, an upper portion of the pouch 114 will come into contact with the flange of the earlier flight 124. Additional flights 204, 206 are moving into position to support and engage additional pouches (not shown) that are moving on the conveyor 102.

Figure 3:
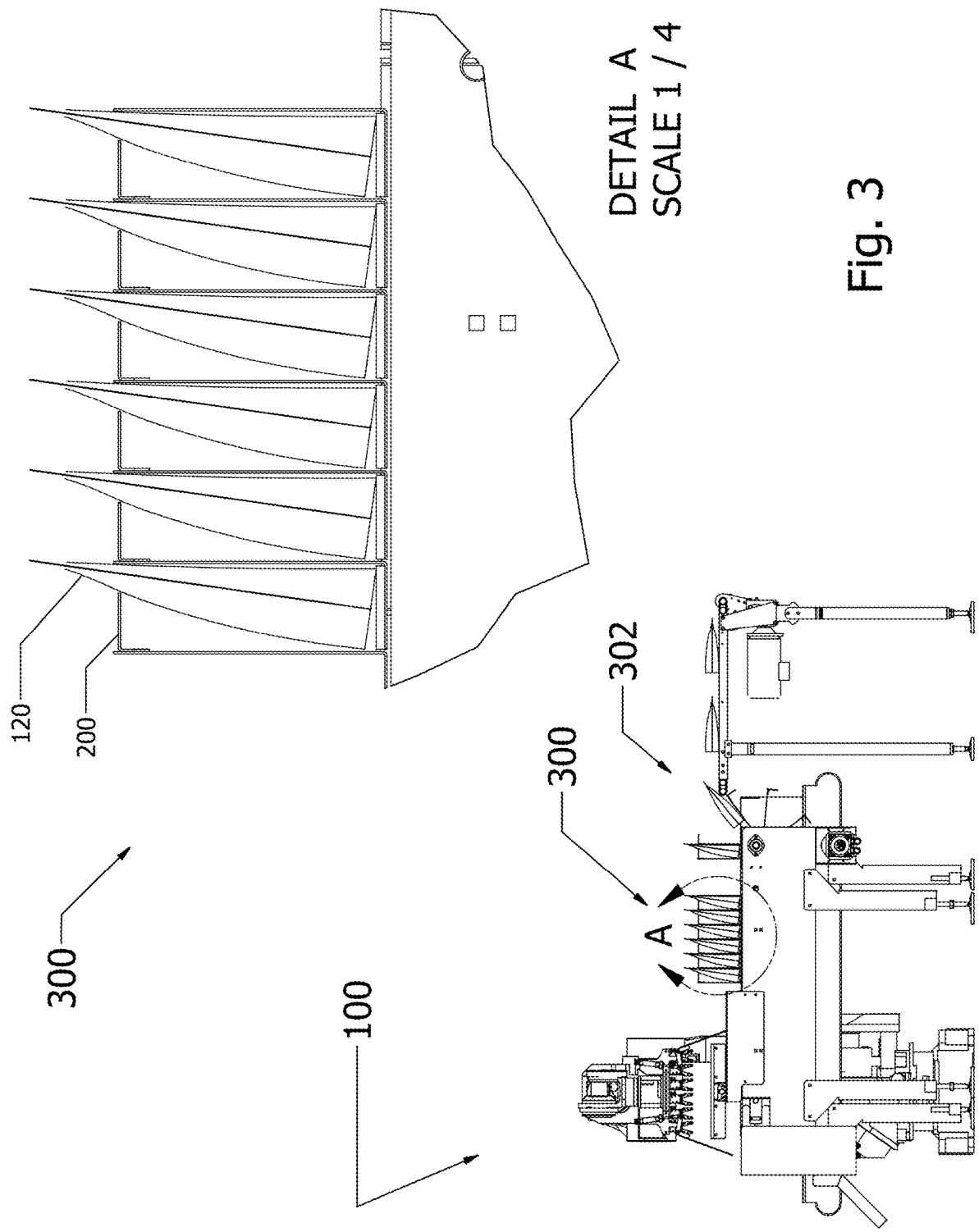
FIG. 3 is an orthographic view of a first group of six pouches inserted between a first group of seven flights and a second group of stand-up pouches being inserted between a second group of flights, and a blown-up view of the six stand-up pouches contained between flights.

FIG. 3 shows the stand-up pouch-packaging assembly 100. In the view, a first group 300 of six pouches has been inserted between a first group of seven flights. A second group 302 of stand-up pouches is also shown in a process of being inserted between a second group of flights. A blown-up view shows the first group 300 of six stand-up pouches contained between flights. The blown-up view also shows how the flange 200 constrains the top portion of pouch 120 to be in a precise and prescribed location, typically at a precise and prescribed time. Within the group 300 of pouches, each pouch is similarly constrained. Accordingly, the top portion of each pouch is precisely located. This reduces the complexity of the design requirements on the grippers on the end-of-arm tool 108, and allows them to operate with greater speed and effectiveness, and with lesser complexity and down-time.

Figure 4:
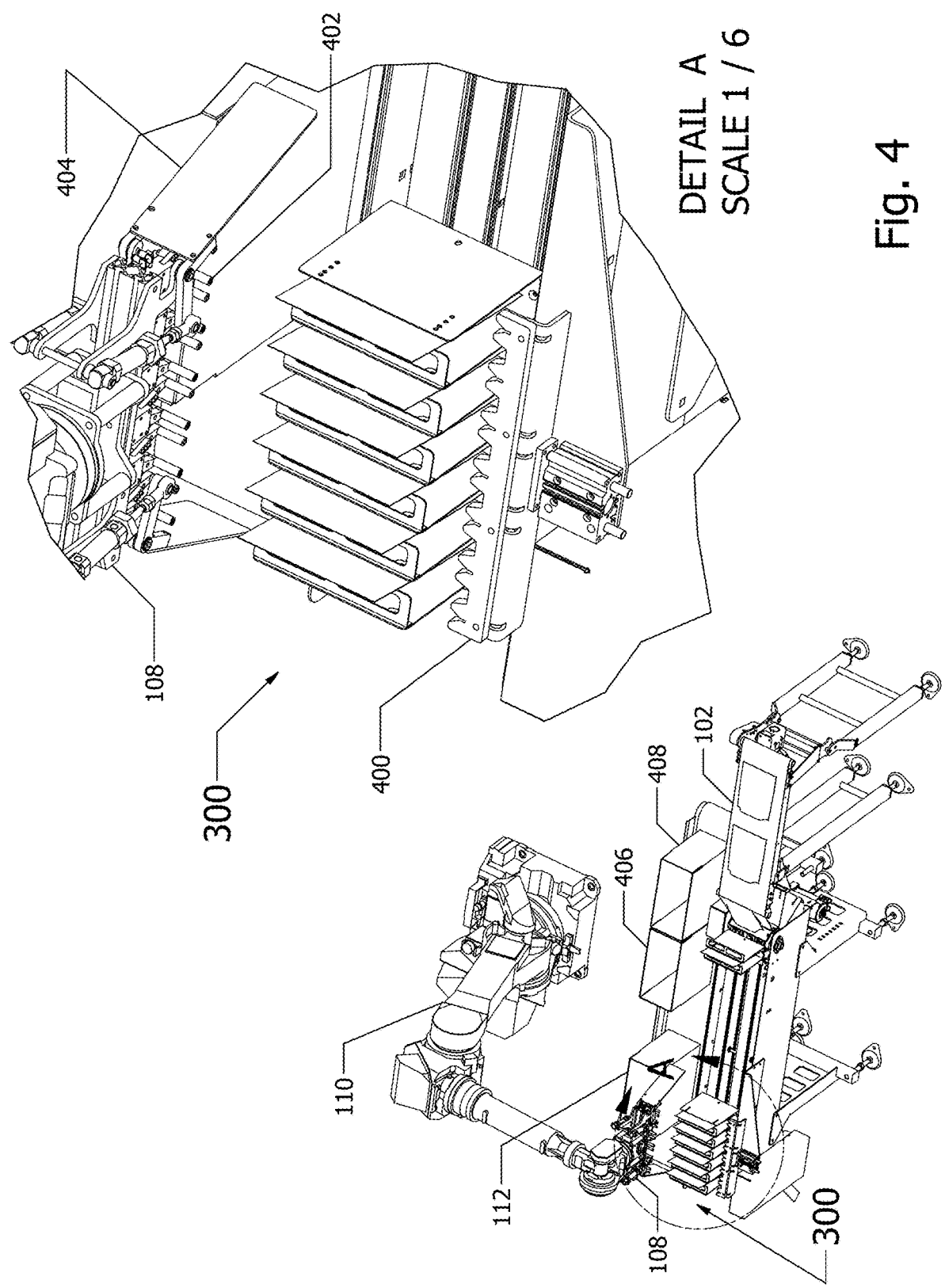
FIG. 4 is a perspective view of a robotic arm and associated end-of-arm tool approaching a flight assembly that contains product carried between the flights, and a blown-up view showing detail of the grippers of the end-of-arm tool approaching the top portions of the stand-up pouches.

FIG. 4 shows an example stand-up pouch-packaging assembly 100 and associated conveyor belt 102. In the view, end-of-arm tool 108 carried by a robotic arm 110 is approaching a group 300 of flights that contains product carried between adjacent flights within the group.

A flight and product indexing assembly 400 is shown in a retracted position. The flight and product indexing assembly 400 is configured with a shape, which may include notches, slots or other features that tend to secure each flight (e.g., flights 122, 124 in FIG. 2) in a group of flights into a specific position. Additionally, the flight and product indexing assembly 400 is shaped to move each pouch or other product to a preferred location between the two adjacent flights holding the pouch in place. In FIG. 4, the flight and flight and product indexing assembly 400 is shown in a retracted position. When advanced, the flight and product indexing assembly 400 engages the flights and product, moving them, if required, to preferred locations. Such movement, to preferred locations, may be performed at a prescribed time. In part because of the operation of the flight and product indexing assembly 400, product will be in expected locations, and at the expected time, when the end-of-arm tool 108 grasps each pouch. When a group of pouches are grasped by the end-of-arm tool 108, the pouches may be inserted into the case 112.

The blown-up view shows detail of the grippers 402 and product-conditioning (and/or product-locating and/or product-securing) paddles 404 of the end-of-arm tool 108. Each pair of grippers 402 is configured to grasp the top portion of a pouch. The product conditioning paddles 404 assist in assuring that the outermost pouches do not extend beyond the sides of the case 112. That is, the product conditioning paddles 404 bunch the pouches together so that they fit into the case 112. When case 112 is filled, each of the cases 406 and 408 will advance, each case advancing to a prescribed location and at a prescribed time.

Figure 5:
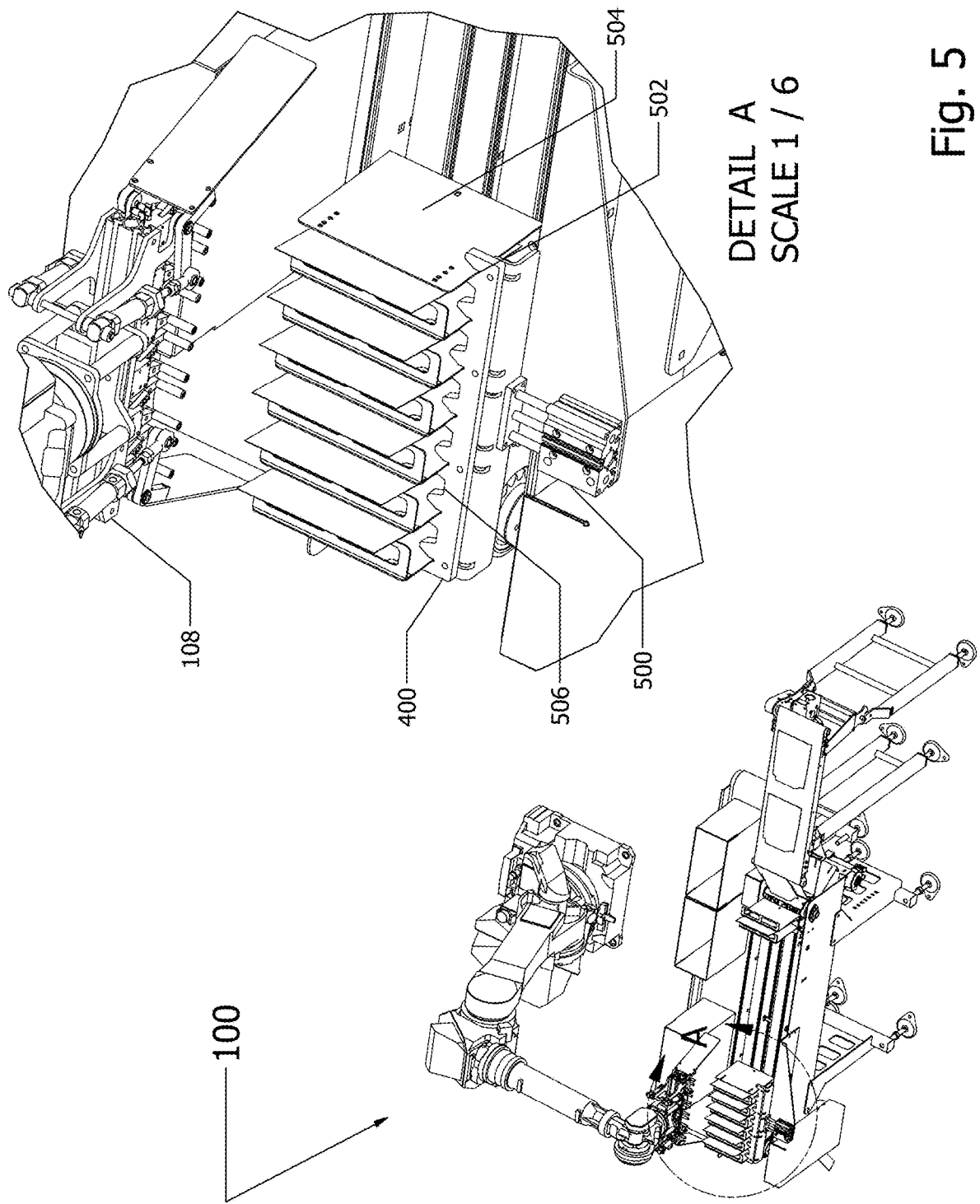
FIG. 5 is a perspective view of a flight-and-product indexing assembly that has advanced to contact the flights indexing the product.

FIG. 5 shows that the flight-and-product indexing assembly 400 has advanced to contact each of a plurality of flights indexing the product, and to contact each pouch/product carried between two flights. The flight-and-product indexer 400 has been advanced by an actuator 500, which may be powered by compressed air, solenoids, or other technology. By advancing, the flight-and-product indexer 400 secures each flight into a precise and prescribed location at a precise and prescribed time, and adjusts or holds the position of each pouch, carried between flights.

In the example shown, the flight-and-product indexer 400 has been advanced by the actuator 500. The advancement has caused a slot 502 defined in the flight-and-product indexer 400 to engage a flight 504. Accordingly, the position of the flight 504 is controlled by the flight-and-product indexer 400.

A notch 506 defined in the flight-and-product indexer 400 has advance to engage a pouch. Thus, while the position of each pouch is substantially controlled by the flights on either side of the pouch, and by a perpendicular flange 200 associated with each flange, the position of each pouch may be even more precisely controlled by a respective notch 506 defined in the flight-and-product indexer 400. In the example shown, with groups defined by six pouches held in position by seven flights, the flight-and-product indexer 400 may define seven slots to secure the flights and six notches to adjust or hold the position of six pouches or other product.

Figure 6:
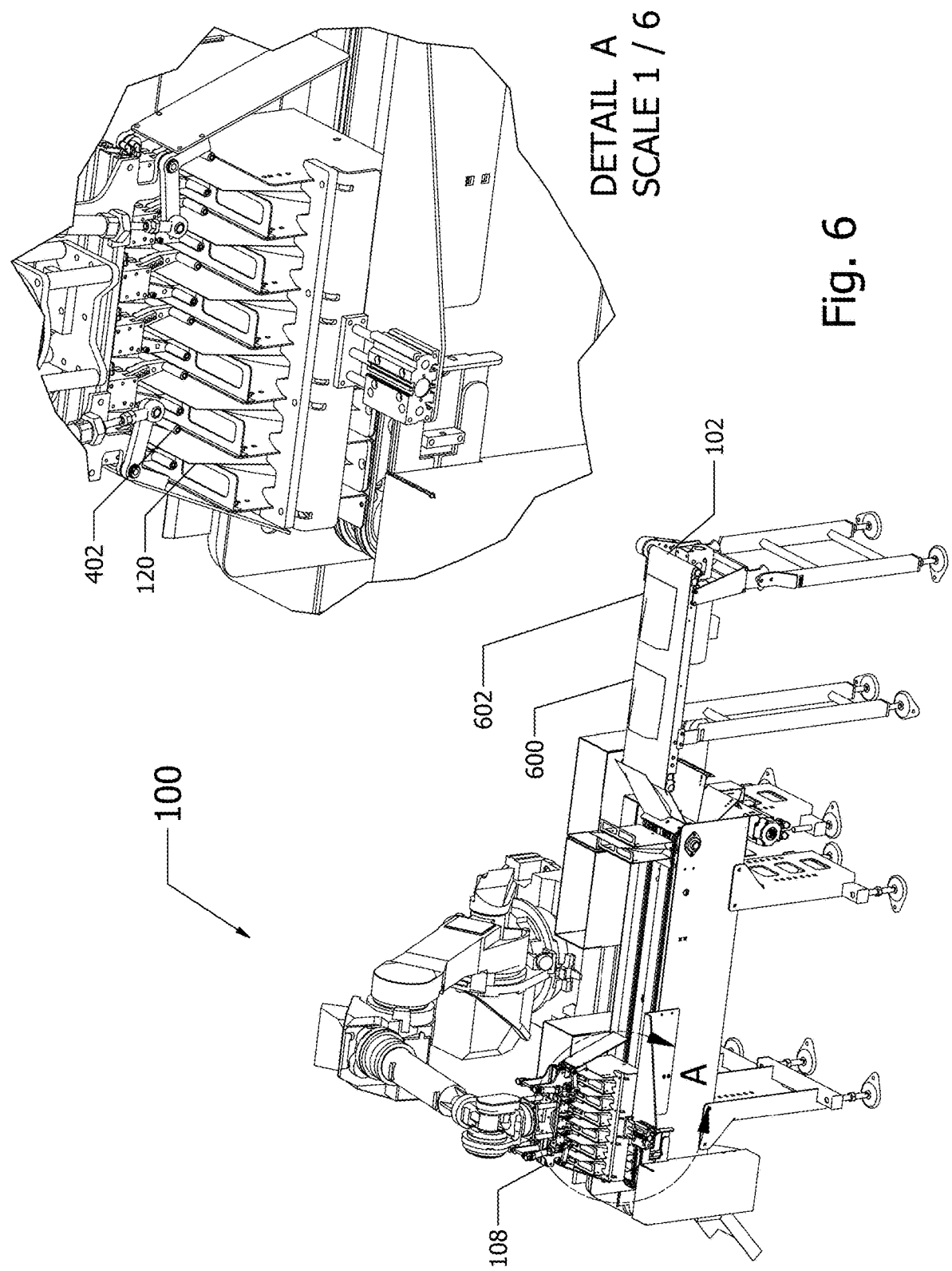
FIG. 6 is a perspective view of the grippers of an end-of-arm tool in a position ready to be closed, and to thereby grip upper portions of stand-up pouches.

FIG. 6 shows the end-of-arm tool 108 in a position wherein it is ready to grasp the pouches. The blown-up view shows detail of the grippers 402 of the end-of-arm tool 108 in a position wherein six pairs of grippers are in a position to grasp the upper portions of six stand-up pouches (e.g., pouch 120).

The flight-and-product indexer 400 continues to be in the advanced position. In the advanced or extended position, the flight-and-product index assembly 400 holds each flight in a specific location, as the end-of-arm tool 108 positions the pairs of grippers in corresponding specific locations.

Additional pouches 602, 604 continue to move on the conveyor belt 102. The flights that will receive these pouches continue to move, driven by their chain-drive assembly. The chain drive associated with the pouches to be removed by the end-of-arm tool 108 may have stopped, to allow the tool to grasp the pouches while they are still. Accordingly, a plurality of chain drives may be used to drive a plurality of respective groups of flights.

Figure 7:
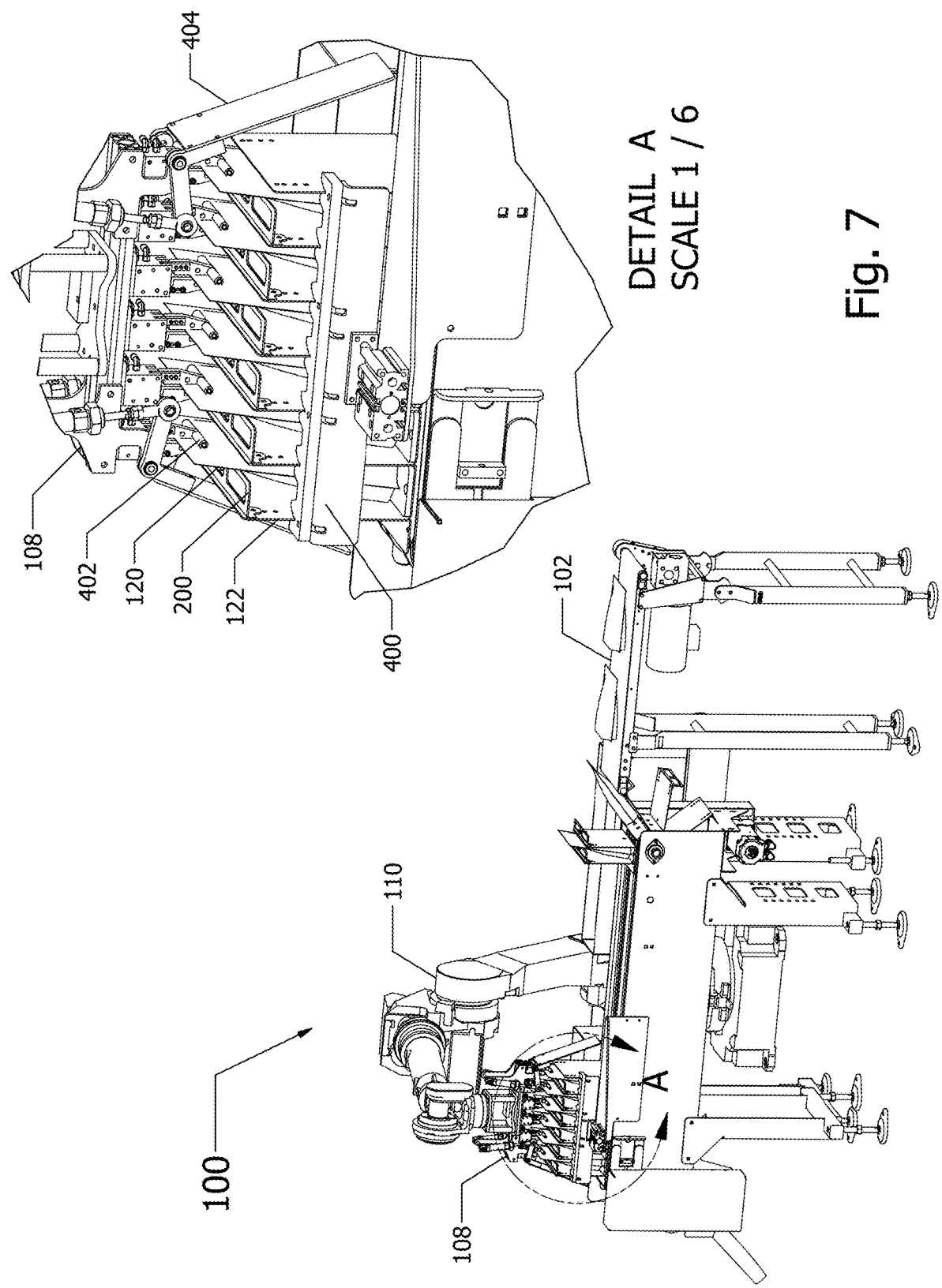
FIG. 7 is a perspective view of the grippers of an end-of-arm tool gripping upper portions of stand-up pouches.

FIG. 7 shows the end-of-arm tool 108 and robotic arm 110 grasping a group of pouches that have been assembled by a first set of flights. The conveyor belt 102 continues to deliver additional pouches to a second set of flights driven by a second chain drive.

Referring to the blown-up portion of FIG. 7, the robotic arm has moved the end-of-arm tool 108 into position from which it has grasped a group of pouches that have been assembled by a first set of flights. Each pair of grippers 402 have grasped the top of a respective pouch 120. The location of the top of the pouch is controlled in part by the flange 200, which extends perpendicularly from each flight 122. The flight-and-product indexer 400 continues to be in the extended position, to secure the positions of the flights. The product conditioning paddles 404 are in an idle position, at both sides of the end-of-arm tool 108.

Figure 8:
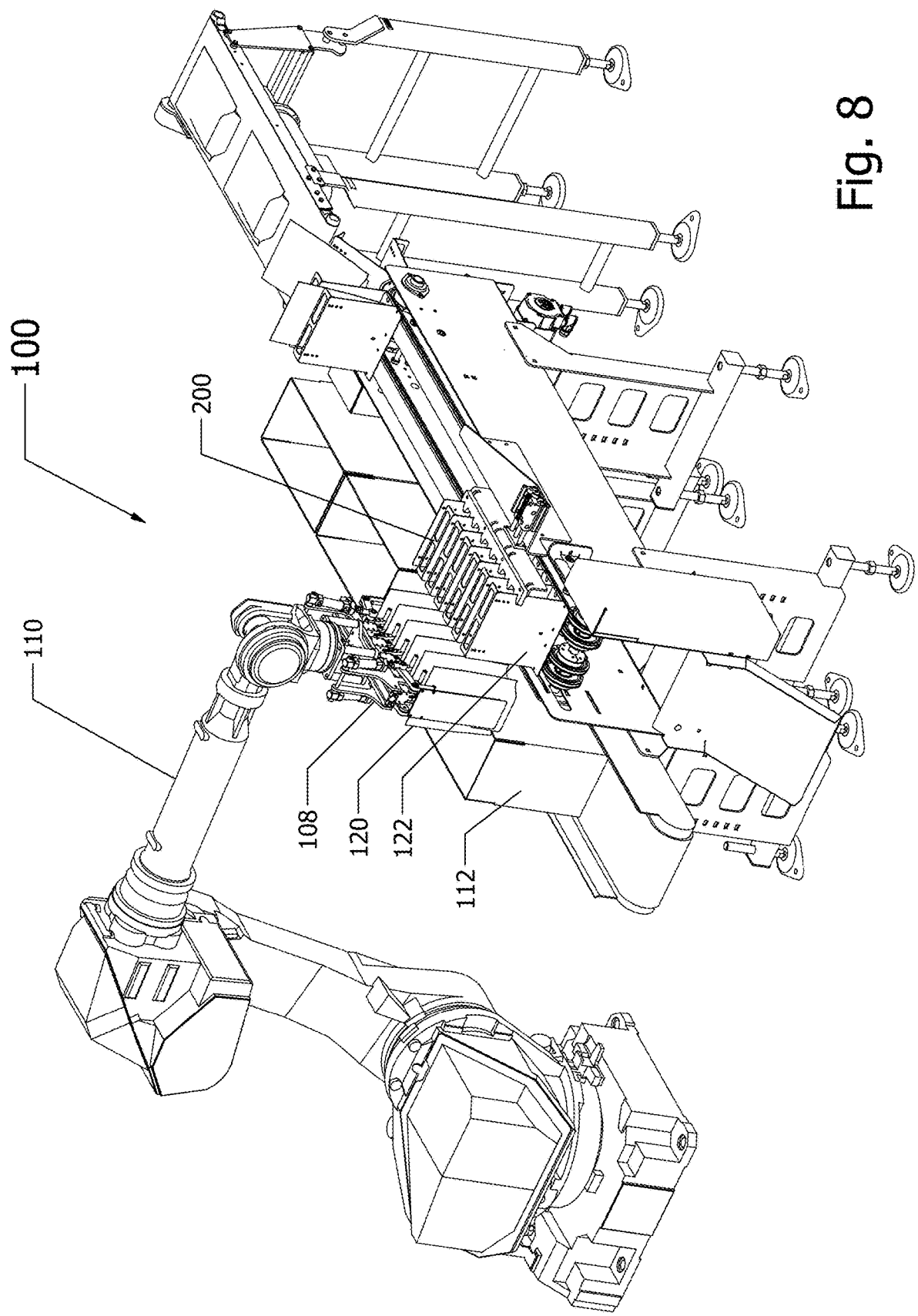
FIG. 8 is a perspective view of the end-of-arm tool after it has withdrawn, using a horizontal motion, to thereby remove the stand-up pouches from the flight assembly.

FIG. 8 shows the robotic arm 110 and end-of-arm tool 108 carrying a group of pouches, from the group of flights between which they were earlier located, to a position above the case 112, into which they will be lowered. Because the flanges 200 narrow the space between flights, the pouches may not fit, if lifted straight up. That is, product in the bottom of each pouch may make it too wide to fit between a flange 200 of a first flight and a second flight. Accordingly, in the view shown, the end-of-arm tool 108 has moved the group of pouches horizontally. In the view shown, the group of pouches 120 has moved in a horizontal direction part of the way to a location above the case 112.

Figure 9:
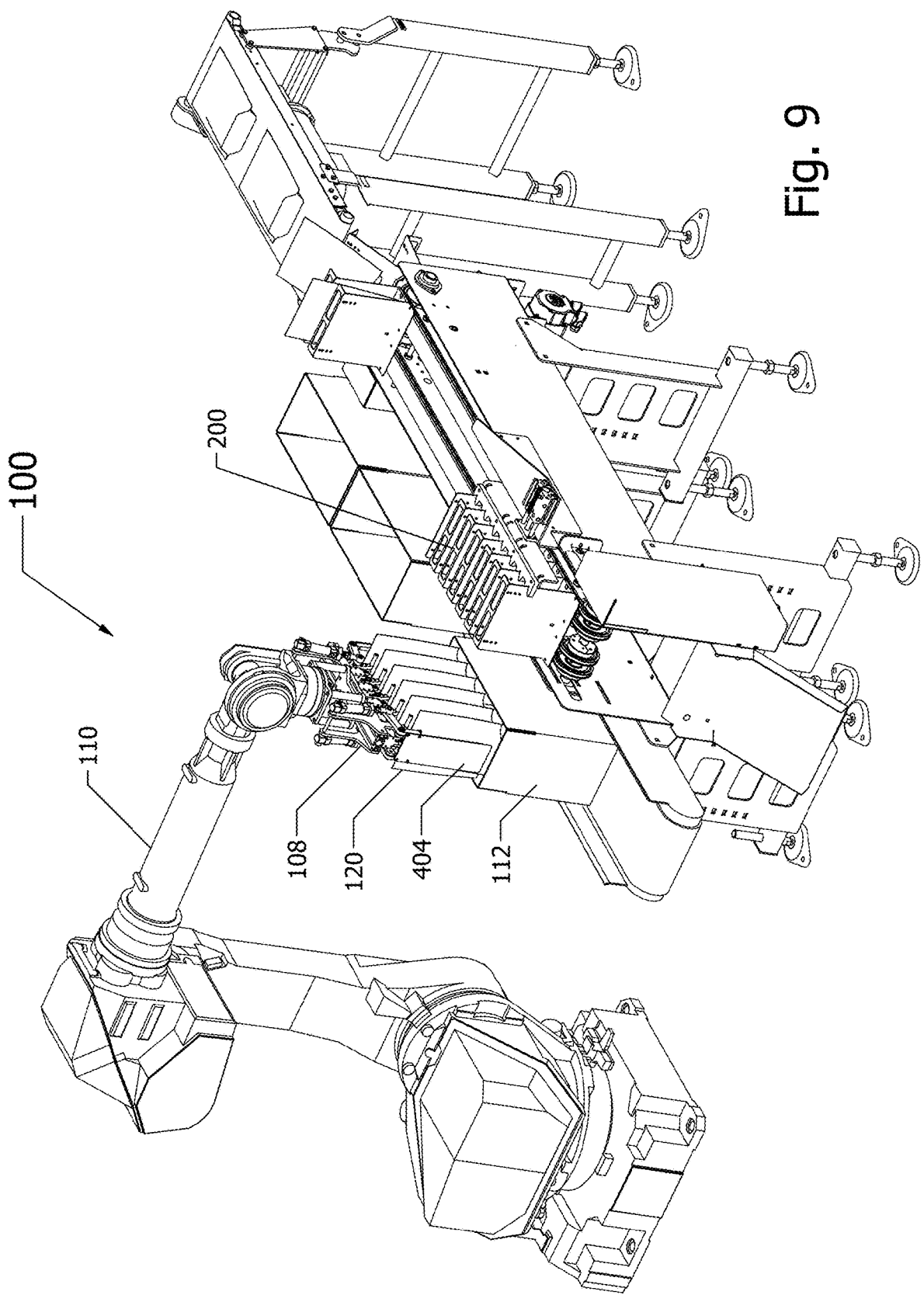
FIG. 9 is a perspective view of the robotic arm and end-of-arm tool moving a group of stand-up pouches to a position above a case to be filled with the pouches.

FIG. 9 shows the robotic arm 110 and end-of-arm tool 108 carrying a group of pouches 120 to a position above the case 112, into which the group of pouches will be lowered. The product conditioning paddles 404 (and a similar paddle, not shown, on the other side) have applied pressure to the pouches on each side of the group (i.e., the first and sixth pouches) to squeeze the group of pouches together, prior to being lowered into the case 112. Thus, the product conditioning paddles 404 tend to ensure that all pouches are bunched together sufficiently to be lowered into the case 112.

Figure 10:
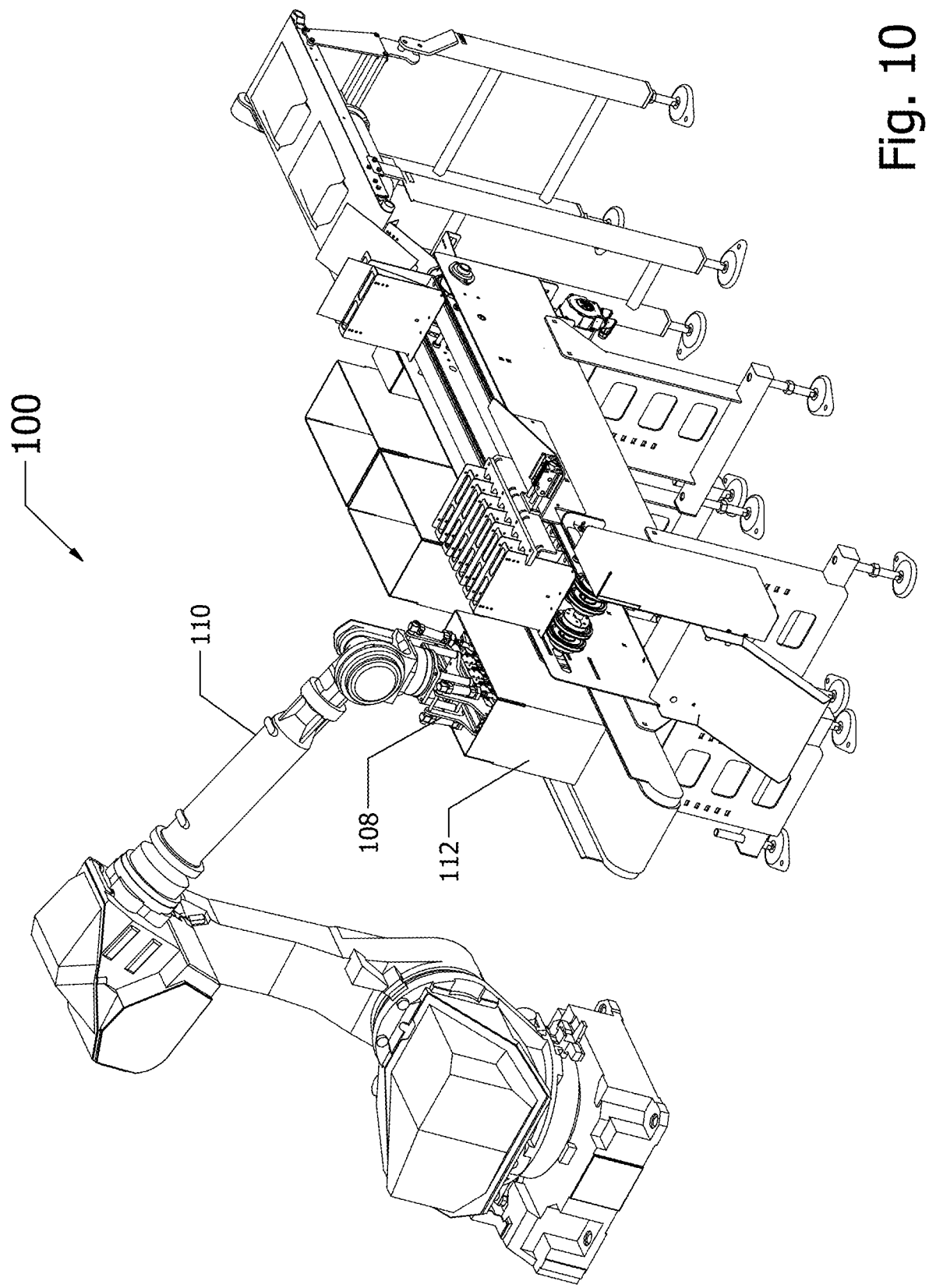
FIG. 10 is a perspective view of the robotic arm and end-of-arm tool lowering a group of stand-up pouches into a case.

FIG. 10 shows the robotic arm 110 and end-of-arm tool 108 lowering a group of pouches into the case 112. The product conditioning paddles have also been lowered into the case 112, to keep the pouches bunched together and in an arrangement that fits into the case. Because a distance between the paddles can be accurately known, and the location of the case known, it can be determined with certainty that the pouches will actually be located within the case when the robotic arm lowers them into the case.

Figure 11:
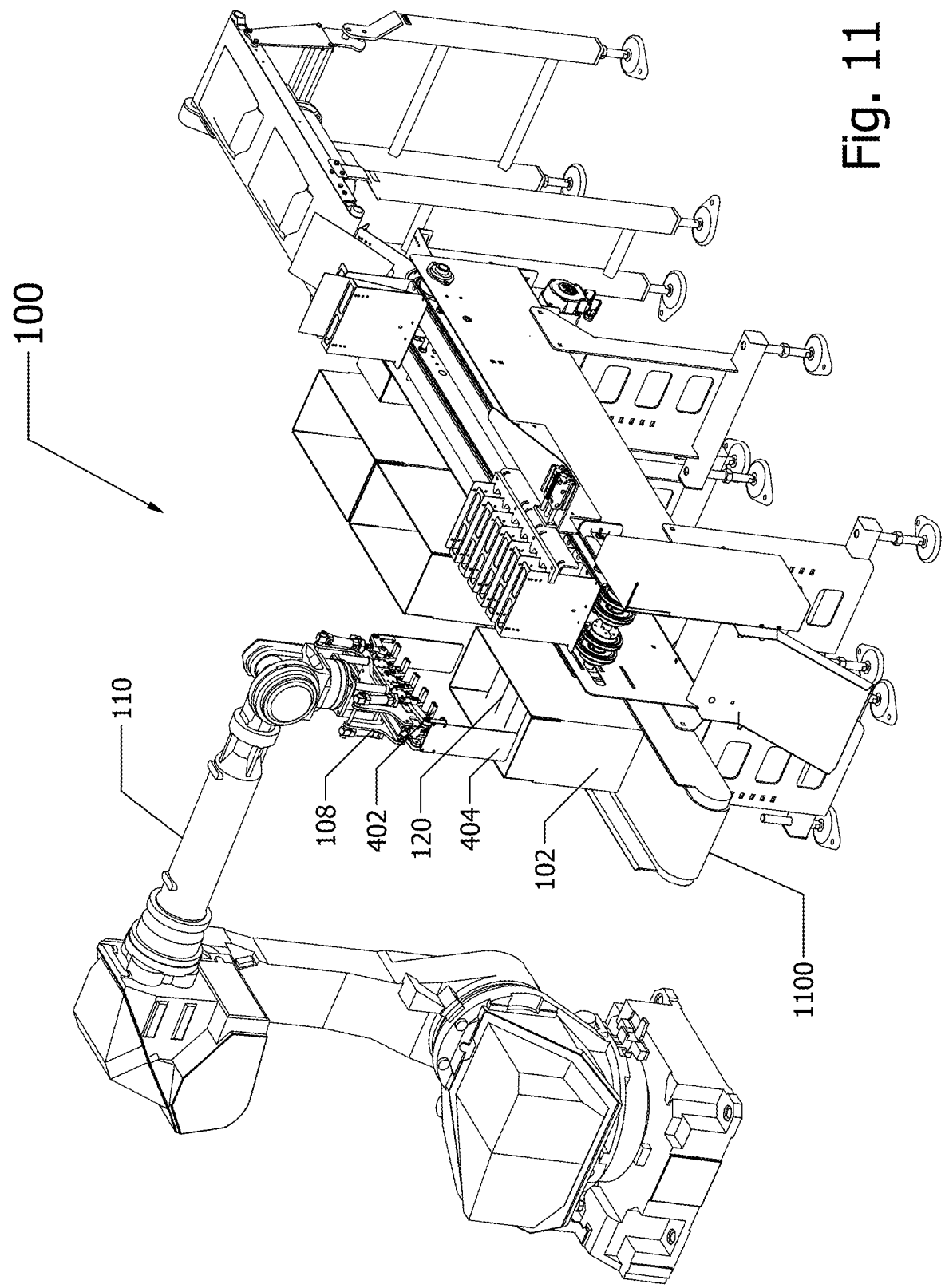
FIG. 11 is a perspective view of the robotic arm and end-of-arm tool, having placed the stand-up pouches in the case, moving to an elevated location to allow the case to resume travel on the conveyor.

FIG. 11 shows the stand-up pouches 120 in the case 112, and shows the robotic arm 110 and end-of-arm tool 108 in a retracted position, elevated from the case 112, to allow the case to travel on the conveyor 1100. The grippers 402 and product conditioning paddles 404 are visible, since they have been lifted out of the case.

Figure 12:
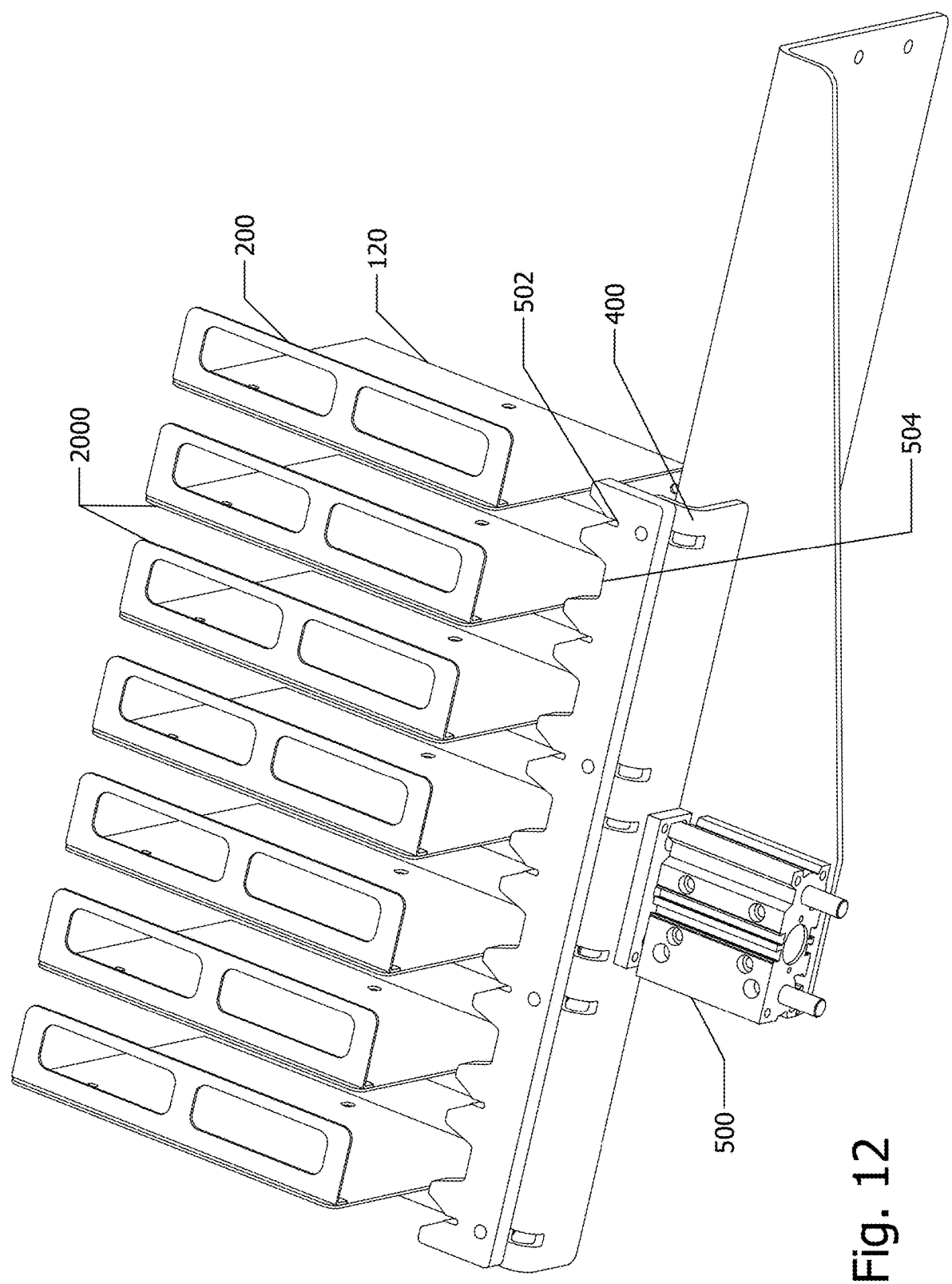
FIG. 12 is a perspective view of a group of seven flights having perpendicular flanges that are configured to precisely position the upper portions of the stand-up pouches for grasping, and showing a flight and product indexer in a retracted position.

FIG. 12 shows a group of seven flights 120. Each flight may be configured to include a flat plate or plate-like portion and a perpendicular flange 200. The width of the flange is configured to result in a gap 2000 between an edge of the flange and an adjacent flight. The size of the gap 2000 may be selected to precisely position the upper portions of the stand-up pouches. This results in better operation of grippers that grasp the upper portions of the stand-up pouches.

FIG. 12 also shows a flight and product indexer 400 in a retracted position. The actuator 500 has pulled the flight and product indexer 400 away from a previous group of seven flights, and has yet to advance the flight and product index into contact with the current group of flights. The flight and product indexer 400 may define a plurality of slots 502 or other structure, designed to engage flights. In the example shown, each slot is configured and spaced to engage one of the plurality of flanges when the actuator 500 advances the flight and product indexer 400 toward, and into contact with, the group of flights. The flight and product indexer 400 also defines a plurality of notches 504 or other structures, designed to adjust and/or hold product (e.g., pouches) in a preferred position between the flights.

Figure 13:
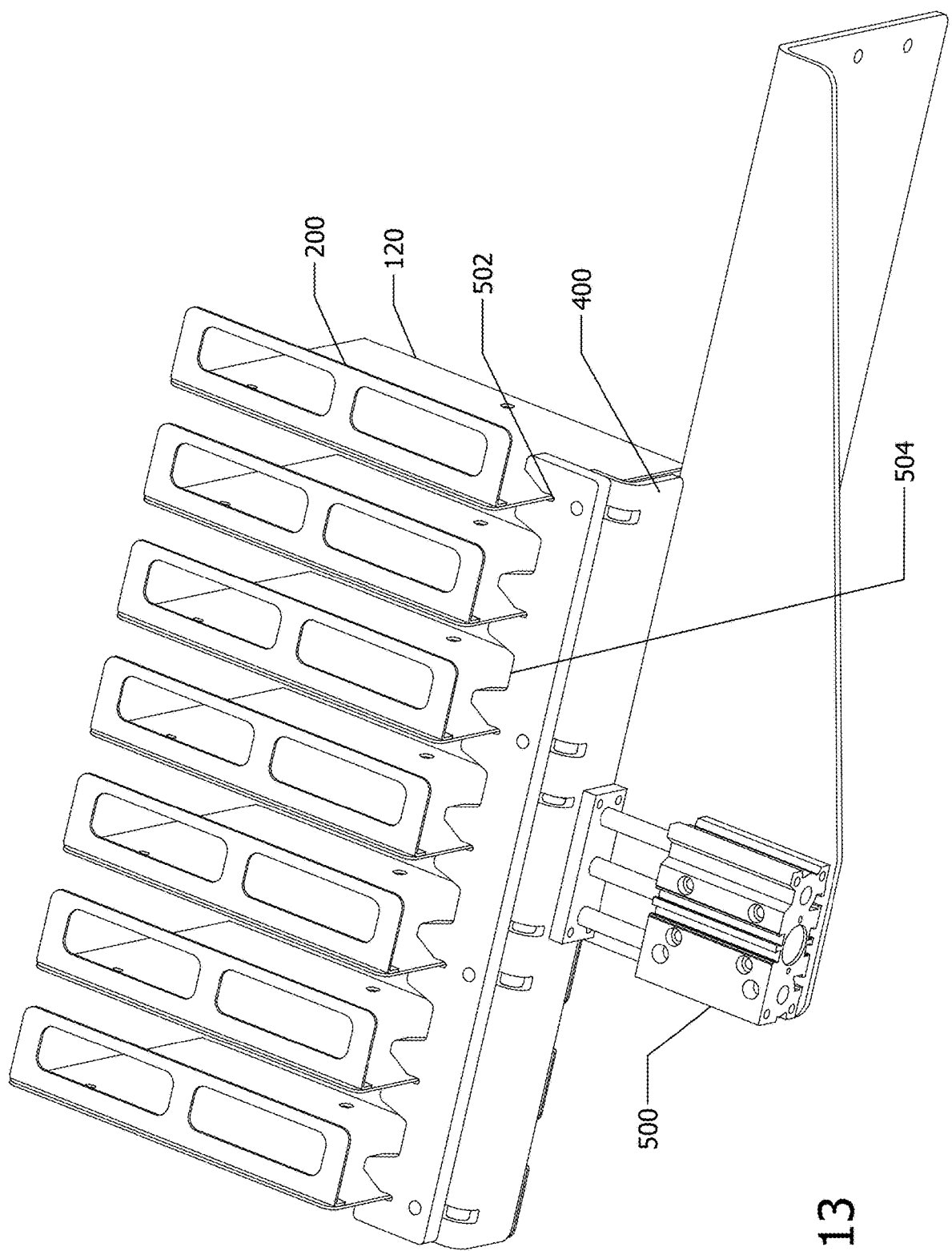
FIG. 13 is a perspective view of a group of seven flights configured with perpendicular flanges configured to precisely position the upper portions of the stand-up pouches, and showing a flight and product indexer in an extended position, wherein the flight and product indexing assembly has precisely secured each flight in a prescribed location and secured product in locations appropriate to be grasped by an end-of-arm tool of a robotic arm.

FIG. 13 shows a group of flights 120 that has been engaged by a flight and product indexer 400 in an extended position. The flight and product indexer 400 has been extended by the actuator 500. In the extended position, the flight and product indexer 400 secures each flight in a prescribed location. Notches 504 defined in the flight and product indexer 400 a secure product in a location appropriate to be grasped by an end-of-arm tool of a robotic arm. The notches 504 are shown on the right side of the space between flights, in a manner that corresponds to the flanges 200, which tend to push product to the right. However, the width of the flanges and the size and positioning of the notches may be adjusted for any particular application or use.

Figure 14:
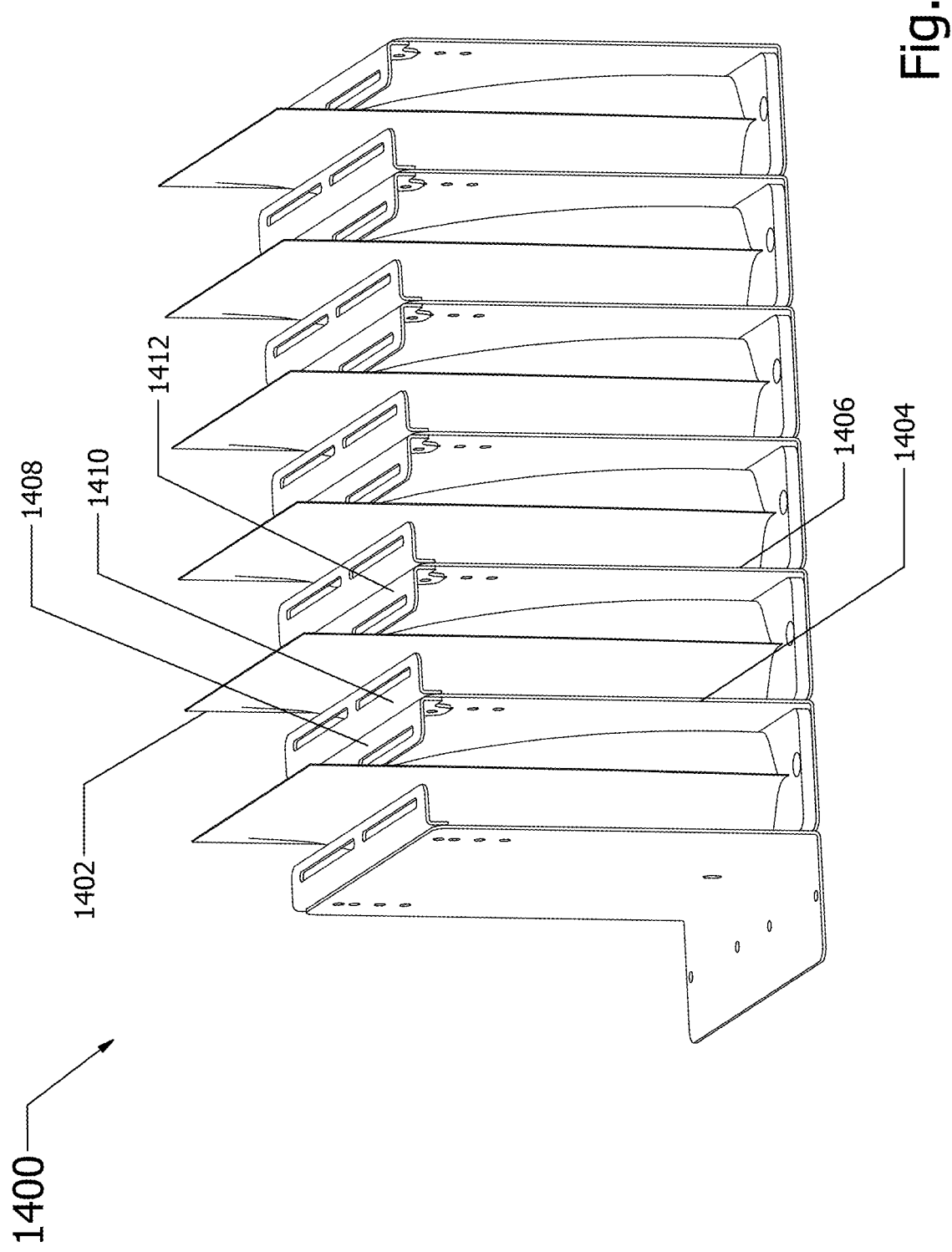
FIG. 14 is a perspective view of an alternative design of a product indexing assembly, wherein each pouch is positioned by a flange on each flight between which the pouch is carried.

FIG. 14 is a perspective view of an alternative design 1400 of a product indexing assembly configured to position product precisely to be grasped by an end-of-arm tool. The design 1400 may be better-suited to pouches having greater content, i.e., wider pouches. A pouch 1402 is carried between a first flight 1404 and a second flight 1406. The first flight 1404 has a first flange 1408 on one side, and a second flange 1410 on the other. The second flange 1410 is in contact with a first side of an upper portion of the pouch 1402. A flange 1412 of the flight 1406 is in contact with a second side of the upper portion of the pouch 1402. Because the upper portion of the pouch 1402 is constrained by flanges 1410 and 1412, it will be in a prescribed location when an end-of-arm tool grasps it.

Example Methods of Operation

Figure 15A:
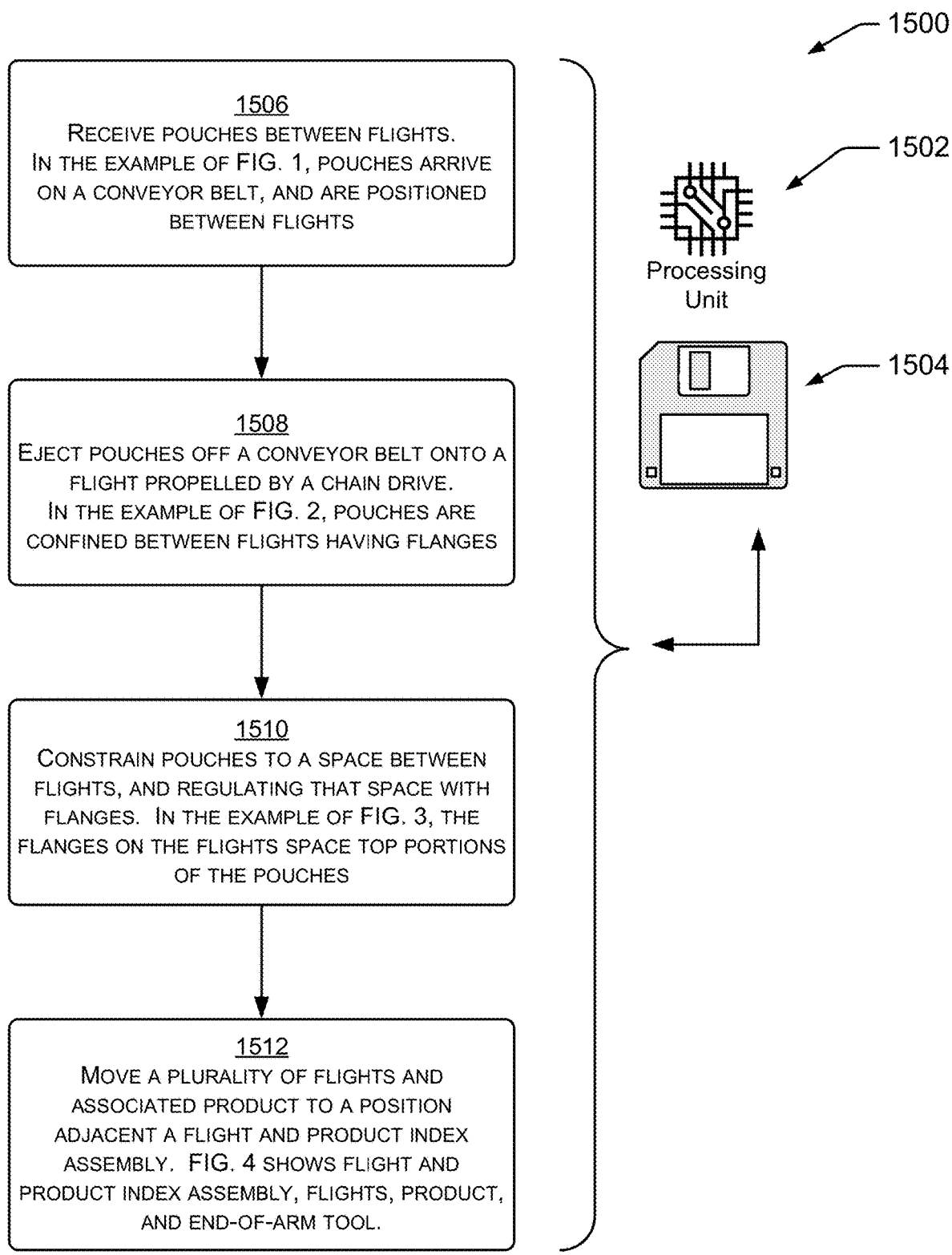

FIGS. 15A-15C are flowcharts showing example methods 1500 and operation of flight and product indexer assemblies, which may be used to package products, such as pouches (e.g., pouches packed with granola, nuts, candies, etc.). The methods and operation may be performed and/or directed by any desired integrated circuit, logic devices, programming, etc. The example methods of FIGS. 15A-15C may be implemented at least in part using the techniques, designs, mechanisms and machinery, and/or variations thereof, seen in FIGS. 1-14. However, the methods of FIGS. 15A-15C contain general applicability, and are not limited by other drawing figures and/or prior discussion. The functional blocks of FIGS. 15A-15C may be implemented by software and/or hardware structures or devices that are configured to operate a packaging assembly line, machine or device. In an example, the packaging assembly line, machine or device is as, or similar to, the devices shown in FIGS. 1-14. In a further example, one or more functional blocks may be implemented by device(s) such as a microprocessor 1502, a ladder logic device, a microcontroller or other logic device, etc., one or more memory devices, computer-readable media, application specific integrated circuits, software blocks, subroutines, programs, etc. Computer-readable media, as the term is used herein, includes, at least, two types of computer-readable media, namely computer storage media 1504 and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer storage media 1504 may be non-transitory in nature. In contrast, communication media may embody computer readable instructions, data structures, program modules, or other data in a modulated data signal, such as a carrier wave, or other transmission mechanism.

As defined herein, computer storage media 1504 does not include communications media.

In the example of block 1506, pouches are received from a conveyor and organized between plate-like flights, each having a perpendicularly-extending flange. FIG. 1 shows example implementation of block 1506, wherein a stand-up pouch-packaging assembly receives and locates pouches between flights. In the example, pouches arrive on a conveyor, and are racked and/or organized by groups of flights. In the example of FIG. 1, six pouches are shown having been received by, and positioned between, seven flights. FIG. 1 also shows a plurality of flights moving counter-clockwise in response to the chain drive, actively receiving pouches between the moving flights. Each pouch is secured between first and second flights, and an upper portion of each pouch is constrained between a flange of the first flight, on a first side of the pouch, and the second flight, on the second side of the pouch.

In the example of block 1508, pouches are ejected off the end of the conveyor and each pouch confined between two flights. FIG. 2 shows an example implementation of block 1508, wherein a pouch is ejected off a conveyor belt and onto a flight that is propelled by a chain drive. The blown-up view of FIG. 2 shows a first stand-up pouch that is constrained between first and second flights, and an upper portion that is constrained between a flange of the first flight and a second flight. A second pouch has left the conveyor 102 and has landed on the flight 116. As the flight 116 advances counter-clockwise, the pouch 114 will be constrained between the flights 124 and 116.

In the example of block 1510, pouches are constrained within a space between flights. A location of an upper portion of each pouch is further constrained between a plate-like body of one flange and a flange extending from a second flight. FIG. 3 shows an example implementation of block 1510, wherein a first group of six pouches having been inserted between, and constrained by, a first group of seven flights. A second group 302 of pouches is moving down the conveyor belt and into positions determined by a second group of flights.

In the example of block 1512, a plurality of flights and an associated plurality of pouches are moved to a position adjacent a flight and product index assembly. FIG. 4 shows an example implementation of block 1512, wherein a plurality of flights and associated product (e.g., pouches) move into position adjacent to a flight and product indexing assembly, an end-of-arm tool, and a packaging case. The flights may be moved by a chain drive, and the product is moved by the flights. The flight and product indexing assembly is in the retracted position.

In the example of block 1514, the flight and product indexing assembly is extended to contact the plurality of flights and/or associated pouches carried between flights. FIG. 5 shows an example implementation of block 1514, wherein an actuator extends the flight and product indexing assembly to contact a group of flights, and to thereby secure the flights in a precise location and to move product as needed. The blown-up view shows flights held in place by slots of the flight and product indexing assembly 400.

In the example of block 1516, grippers of an end-of-arm tool move into position to grasp each pouch. FIG. 6 shows an example implementation of block 1516, wherein grippers of an end-of-arm tool are moved toward upper portions of stand-up pouches, as a plurality of grippers of the end-of-arm tool prepares to grasp the plurality of pouches.

In the example of block 1518, grippers of an end-of-arm tool grasp onto each pouch carried by the plurality of flights. FIG. 7 shows an example implementation of block 1518, wherein grippers of an end-of-arm tool grip upper portions of stand-up pouches. In the example shown, the grippers may have a construction that is plier-like and/or jaw-like, wherein the upper portions of the stand-up pouches are grasped within the gripper tool.

In the example of block 1520, plurality of grippers of the end-of-arm tool withdraws the pouches (optionally in a horizontal manner) from the plurality of flights. FIG. 8 shows an example implementation of block 1520, wherein the end-of-arm tool withdraws the stand-up pouches from the flight assembly using a horizontal motion. The lower portions of the pouches may contain more product than could fit between the flanges and flights constraining each pouch, due to the flange extending perpendicularly from one of the flights. Accordingly, the horizontal motion may be used—if required—to withdraw the pouches.

In the example of block 1522, the product is moved to a location over a case to be filled. FIG. 9 shows an example implementation of block 1522, wherein the robotic arm and/or end-of-arm tool moves a group of stand-up pouches to a position above a case. The product conditioning paddles may squeeze the pouches together somewhat, so that the pouches will all fit into the case, and will not contact or snag one or more sides of the case. The paddles may provide an inward bias to group the pouches together, and to prevent pouches from swinging or moving independently.

In the example of block 1524, a group of pouches is lowered into a case. FIG. 10 shows an example implementation of block 1524, wherein the robotic arm and/or end-of-arm tool of a stand-up pouch-packaging assembly load a group of stand-up pouches into a case. In the example shown, the case is open on the top, and the robotic arm lowers the end-of-arm tool gripping the pouches into the case. The product conditioning paddles may continue to squeeze the pouches together somewhat, so that the pouches will all fit into the case.

In the example of block 1526, the grippers release their grip on the pouches. Having been released, the pouches are then supported by, and contained in, the case. FIG. 11 shows an example implementation of block 1526, wherein the robotic arm and end-of-arm tool have positioned the stand-up pouches in the case, the grippers of the end-of-arm tool have released their grip on the pouches, the product conditioning paddles have released their inward pressure on the products, and the robotic arm has moved the end-of-arm tool upwardly, to allow the case to resume travel on the conveyor.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. As an example, while groups of six pouches and seven flights have been discussed, other numbers may be used, while still in keeping with the teachings described herein.

What is claimed is:

1. An assembly, comprising:
    at least three flights, wherein at least two of the at least three flights comprise a plate and a flange, and wherein the flange is perpendicular to the plate; and
    a flight and product indexer, configured to control spacing between adjacent flights from among the at least three flights, and configured to control a location of a product element carried between two adjacent flights, wherein the flight and product indexer is movable between positions, comprising:
        a retracted position wherein the flight and product indexer is not in contact with the at least three flights; and
        an extended position wherein the flight and product indexer is in contact with the at least three flights.

2. The assembly of claim 1, wherein the flight and product indexer defines:
    a plurality of slots at intervals, wherein each slot is configured to engage a flight; and
    a plurality of notches at intervals, wherein each notch is configured to engage a pouch.

3. The assembly of claim 1, wherein product, carried between adjacent flights, is removed when the flight and product indexer is advanced to contact the at least three flights.

4. The assembly of claim 1, wherein the flange narrows a space between two adjacent flights to restrict a location of a top of a pouch.

5. The assembly of claim 1, wherein the flange restricts a position of an upper portion of a pouch.

6. The assembly of claim 1, wherein the flange extends roughly two-thirds of a distance between adjacent flights.

7. A flight and indexing assembly, comprising:
    at least three flights, driven by a chain drive assembly, wherein at least two of the at least three flights comprise a plate and a flange, and wherein the flange is perpendicular to the plate;
    a conveyor, positioned to deliver product to a side of the plate to which the flange is not attached; and
    a flight and product indexer, configured to control spacing between adjacent flights from among the at least three flights, wherein the flight and product indexer is movable between positions, comprising:
        a retracted position wherein the flight and product indexer is not in contact with the at least three flights; and
        an extended position wherein the flight and product indexer is in contact with the at least three flights.

8. The flight and indexing assembly of claim 7, wherein the flight and product indexer defines:
    a plurality of slots at intervals, wherein each slot is configured to engage a flight; and
    a plurality of notches at intervals, wherein each notch is configured to engage a pouch.

9. The flight and indexing assembly of claim 7, wherein product, carried between adjacent flights, is removed when the flight and product indexer is advanced to contact the at least three flights.

10. The flight and indexing assembly of claim 7, wherein the flange narrows a space between two adjacent flights to restrict a location of a top of a pouch.

11. The flight and indexing assembly of claim 7, wherein the flange restricts a position of an upper portion of a pouch.

12. A method of operating an assembly, comprising:
    confining a plurality of product items between a plurality of flights, wherein each flight comprises a plate and a flange, and wherein the flange is perpendicular to the plate;
    moving a flight and product index assembly between:
        a first position configured to control spacing between the plurality of flights, wherein a plurality of slots in the flight and product indexer engage flights, thereby locating the flights in prescribed areas; and
        a second position, wherein the flight and product index assembly does not engage the plurality of flights and the flights are allowed to move; and removing the plurality of product items when the flight and product index assembly is in the first position.

13. An assembly, comprising:
at least three flights, wherein at least two of the at least three flights comprise a plate and a flange, and wherein the flange is perpendicular to the plate; and
a flight and product indexer, configured to control spacing between adjacent flights from among the at least three flights, and configured to control a location of a product element carried between two adjacent flights, wherein the flight and product indexer defines:
a plurality of slots to secure a corresponding plurality of flights in prescribed locations; and
a plurality of notches to secure a corresponding plurality of pouches in prescribed locations.

14. An assembly, comprising:
at least three flights, wherein at least two of the at least three flights comprise a plate and a flange, and wherein the flange is perpendicular to the plate; and
a flight and product indexer, configured to control spacing between adjacent flights from among the at least three flights, and configured to control a location of a product element carried between two adjacent flights, wherein the flight and product indexer defines a plurality of slots, and wherein each slot is V-shaped.

15. An assembly, comprising:
at least three flights, wherein at least two of the at least three flights comprise a plate and a flange, and wherein the flange is perpendicular to the plate; and
a flight and product indexer, configured to control spacing between adjacent flights from among the at least three flights, and configured to control a location of a product element carried between two adjacent flights, wherein a gap is formed between a flange of a first flight and a plate of a second flight and wherein notches defined in the flight and product indexer hold the first flight in a first position and the second flight in a second position.

16. A flight and indexing assembly, comprising:
at least three flights, driven by a chain drive assembly, wherein at least two of the at least three flights comprise a plate and a flange, and wherein the flange is perpendicular to the plate;
a conveyor, positioned to deliver product to a side of the plate to which the flange is not attached; and
a flight and product indexer, configured to control spacing between adjacent flights from among the at least three flights, wherein the flight and product indexer defines:
a plurality of slots to secure a corresponding plurality of flights in prescribed locations; and
a plurality of notches to secure a corresponding plurality of pouches in prescribed locations.

17. A flight and indexing assembly, comprising:
at least three flights, driven by a chain drive assembly, wherein at least two of the at least three flights comprise a plate and a flange, and wherein the flange is perpendicular to the plate;
a conveyor, positioned to deliver product to a side of the plate to which the flange is not attached; and
a flight and product indexer, configured to control spacing between adjacent flights from among the at least three flights, wherein the flight and product indexer defines a plurality of slots, and wherein each slot is V-shaped.

18. A flight and indexing assembly, comprising:
at least three flights, driven by a chain drive assembly, wherein at least two of the at least three flights comprise a plate and a flange, and wherein the flange is perpendicular to the plate;
a conveyor, positioned to deliver product to a side of the plate to which the flange is not attached; and
a flight and product indexer, configured to control spacing between adjacent flights from among the at least three flights, wherein a gap between a flange of a first flight and a plate of a second flight, the first flight adjacent to the second flight, is a spaced distance determined at least in part by notches defined in the flight and product indexer holding the first flight in a first position and the second flight in a second position.

* * * * *